Patented May 15, 1951

2,552,709

UNITED STATES PATENT OFFICE 2,552,709

PROCESS FOR THE PURIFICATION OF RHODIUM

Francis Sidney Clements and Alan Richardson Raper, London, England, assignors to The International Nickel Company Incorporated, New York, N. Y., a corporation of Delaware No Drawing. Application July 5, 1950, Serial No. 172,202. In Great Britain July 8, 1949

6 Claims. (Cl. 23—50)

This invention relates to the purification of rhodium.

Most of the world's production of rhodium comes from platinum metal concentrates. No attempt is made to separate the rhodium in the early stages of refining and the first aim usually is to remove gold, platinum, and palladium by aqua regia treatment. After this preliminary treatment the rhodium is obtained in association with iridium, ruthenium, small amounts of the other metals of the platinum group, base metals from cementation residues such as copper, bismuth, lead, tellurium, and siliceous material.

Whatever method is employed in the further treatment of this material the rhodium is ultimately obtained in aqueous solution containing appreciable amounts of the base metals mentioned above and some of the precious metals.

It is fairly common practice at some stage in refining to convert the rhodium to the soluble sodium hexanitritorhodate $Na_3[Rh(NO_2)_6]$ and to precipitate the rhodium from solution as the insoluble potassium or ammonium salts. These latter salts are then decomposed with hydrochloric acid to form the soluble potassium or ammonium hexachlororhodates, e. g. $K_3[RhCl_6]$. Part of the base metal content, particularly lead, bismuth and tellurium, is carried along with the rhodium and special steps have to be taken to produce high purity rhodium. In one method sodium sulphide is added to the solution of sodium hexanitritorhodate to precipitate base metals together with a part of the rhodium as sulphide. After this treatment the rhodium is precipitated as the ammonium salt and this salt decomposed with hydrochloric acid. This cycle of operations may have to be repeated five or six times to remove all traces of lead and other impurities. Alternatively base metals may be removed from the solution of sodium hexanitritorhodate by hydrolytic precipitation at controlled pH with or without the addition of a suitable carrier, but the operation may have to be repeated several times and is difficult to apply if much copper is present. Many other methods for removing base metals from rhodium have been used from time to time. Some commercial refiners have separated the rhodium as metal in an impure state and have relied on the chlorination of rhodium at elevated temperatures to remove part of the base metals by volatilisation and have then leached the insoluble rhodium chloride with water, hydrochloric acid or aqua regia.

Most of the procedures described above are too complex for the routine commercial refining of rhodium to the high degree of purity required by modern industry.

It was, therefore, decided that experiments should be carried out to determine whether the existing processes could be modified, or an improved process discovered, which would efficiently remove lead, bismuth, tellurium and other impurities from potassium hexachlororhodate or other complex salt of rhodium. Modifications to existing processes proved satisfactory to a degree but it was considered that such modifications were really additional operations to an already lengthy process. The most promising results were obtained when an entirely new process of treating potassium hexachlororhodate was carried out. It was also found that this process could be applied to other complex rhodium salts and the corresponding free acids.

It is an object of this invention to provide an improved process for the purification of rhodium using a cation exchange resin.

It is a further object of this invention to provide a process for the purification of rhodium whereby the content of base metal impurities which normally occur in rhodium refining operations, such as copper, bismuth, silver, lead, tellurium, tin, chromium, aluminium, manganese and iron is considerably reduced.

It is a still further and more particular object of the invention to provide a process for the purification of rhodium whereby about 95% or more of the impurities are removed in a single cycle of operations.

In accordance with the process of the present invention for the purification of rhodium an aqueous solution of a water-soluble complex rhodium compound in which the rhodium is present in the anion in which the concentration of the said compound is up to $\frac{1}{10}$ molar is treated with a cation exchange resin containing a sulphonic acid group to remove impurities from the solution.

The water-soluble complex rhodium compound may be a complex rhodium salt or a corresponding free acid.

The cation exchange resins containing sulphonic acid groups may have a sulphonic acid group in a nucleus or in a methane sulphonic group. Particularly preferred cation exchange resins which contain sulphonic acid groups are Zeo-Karb 215 and Dowex 50.

Dowex 50 contains nuclear sulphonic acid groups and its preparation is described in United States specification No. 2,366,007.

Zeo-Karb 215 is a resin in which the active groups are largely sulphonic acid groups.

It will, however, be understood that the present invention is not limited to the use of these two resins but other cation exchange resins containing sulphonic acid groups may be used.

Thus, polyfunctional cation exchange resins may be used provided that they contain sulphonic acid groups although the carboxyl and hydroxyl groups take little part in the exchange at the pH values prevailing in the process of the present invention. Examples of these resins are the following: (a) Dowex 30. This is a sulphonated phenol-formaldehyde resin containing sulphonic acid and hydroxyl groups. It is prepared by the condensation of o- and p-phenol sulphonic acids with formaldehyde. (b) Wolfatit KS. This is a resin containing sulphonic acid, carboxyl and hydroxyl groups. It may be made by the condensation of benzaldehyde disulphonic acid with resorcinol and formaldehyde (see British Intelligence Objectives Sub-Committee Report No. 621). (c) Sulphited phenol-formaldehyde resins which contain methylenic sulphonic acid and hydroxyl groups. These are made by heating phenol and formaldehyde with a mixture of sodium sulphite and sodium metabisulphite (see United Kingdom Specification No. 498,251). (d) Sulphonated lignite types of resin typified by Zeo-Karb H, containing sulphonic acid and carboxyl groups.

Preferably the concentration of the complex rhodium compound is between $\frac{1}{10}$ and $1/100$ molar. The initial pH of the solution under treatment should be between 1 and 5.

The process of the present invention may be combined with other processes of purification and therefore it may be used to remove the whole or only a part of the impurities.

While the invention conveniently employs potassium hexachlororhodate as the starting material other corresponding water-soluble salts may be used such as sodium hexachlororhodate, ammonium hexachlororhodate and the corresponding free acid $H_3[RhCl_6]$. The process of the invention also includes the treatment of complex salts such as the potassium and ammonium aquapentachlororhodates, e. g. $K_2[RhCl_5H_2O]$. The corresponding bromine compounds may be used such as potassium, sodium and ammonium hexabromorhodates. Furthermore, the nitrite analogues may be employed in the case of the sodium salt and the free acid, i. e. compounds of the formulae $Na_3[Rh(NO_2)_6]$ and $H_3[Rh(NO_2)_6]$.

According to a preferred embodiment of the invention an aqueous solution of potassium hexachlororhodate in a concentration not exceeding $\frac{1}{10}$ molar is passed through a bed of cation exchange resin. During the passage of the solution cations are replaced by hydrogen ions, whereas anions passed through unchanged. In this way potassium, lead and bismuth ions were removed while the [RhCl₆] anions passed through unaltered.

When the resin had replaced cations by H ions to its fullest extent it was regenerated. This was effected by passing 2 N HCl through the exhausted resin which replaced the K, Pb and Bi and other cations by H ions with the result that the resin reverted to its original condition. Regeneration appeared to take place without deterioration of the resin. The resin was regenerated more than 1000 times without apparent change.

The solution resulting from the passage of potassium hexachlororhodate through the cation exchange resin may be concentrated, ammonium chloride added thereto and the ammonium salt thus produced may be ignited in air and reduced to rhodium metal which may then be subjected to hydrogen fluoride treatment for the removal of silica. While the use of ammonium chloride is convenient and has the advantage of easy removal and the benefit of a slight additional purification, other salts such as alkali metal salts or alkaline earth metal salts may be used, if desired.

By the process of the present invention from potassium hexachlororhodate crystals containing 0.29% Pb, 0.015% Bi and >0.10% Te expressed as a percentage of the rhodium content, rhodium of very good purity was obtained. While the degree of purity depended on the conditions employed the condition considered to be most suitable for process refining gave metal containing 0.0014% Pb, 0.0001% Bi, and 0.002% Te. In addition, Sn, Cr and Al were completely eliminated, Mn and Fe were almost completely eliminated, while the amounts of Ag and Cu present were considerably less than the amounts present in the original material.

The following examples illustrate how the process of the invention may be carried into effect and the advantages thereof:

1. Six solutions of impure potassium hexachlororhodate, varying in concentration from 10 g./l. Rh (0.097 M) to 20 g./l. Rh (0.194 M) were passed through Zeo-Karb 215 cation exchange resin in the hydrogen form. The treated solutions were examined for impurities by spectrographic methods.

The results obtained are shown in the following Table, in which the amounts of base metal are expressed as a percentage of the precious metal content of the treated solution:

| No. | Concentration $K_3[RhCl_6]$ g./l. | Concentration Rh, g./l. | Molar Concentration | Per Cent Pb | Per Cent Bi | Per Cent Te |
|---|---|---|---|---|---|---|
| Original | | | | >0.4 | >0.1 | 0.9 |
| 1 | 45 | 10 | 0.097 | 0.001 | 0.0036 | 0.016 |
| 2 | 54 | 12 | 0.117 | 0.032 | 0.0033 | 0.020 |
| 3 | 63 | 14 | 0.136 | 0.041 | 0.008 | 0.020 |
| 4 | 72 | 16 | 0.155 | 0.130 | 0.020 | 0.030 |
| 5 | 81 | 18 | 0.175 | 0.200 | 0.080 | 0.035 |
| 6 | 90 | 20 | 0.194 | 0.290 | >0.100 | 0.040 |

2. A concentrated solution of impure rhodium chloride containing more than 0.1% of lead, more than 0.005% of bismuth and more than 0.02% of tellurium (all expressed as a percentage of the rhodium content) and obtained by dissolving an impure rhodium hydroxide in the minimum of hydrochloric acid, was diluted so that the rhodium content was reduced from 57 g./l. to 10 g./l. The hydrolytic precipitate of impurities was filtered off and the filtrate was passed through Zeo-Karb 215 resin in the hydrogen form. The treated solution was concentrated by evaporation and the rhodium was crystallised out as ammonium hexachlororhodate by the addition of ammonium chloride. When ignited the salt gave rhodium metal containing:

| | Per cent |
|---|---|
| Pb | 0.0003 |
| Bi | 0.0001 |
| Te | 0.001 |

3. A sample of ammonium hexachlororhodate containing >.1% lead (expressed as a percentage of the rhodium content) and a very low content of bismuth and tellurium, was dissolved in water to give a solution containing 10 g./l. of rhodium. The solution was passed through Zeo-Karb 215 resin in the hydrogen form. The treated solution was concentrated by evaporation and the rhodium was crystallised out as ammonium hexachlororhodate by the addition of ammonium chloride. On ignition this salt gave rhodium metal containing:

| | Per cent |
|---|---|
| Pb | <0.0003 |
| Bi | 0.0001 |
| Te | <0.001 |

4. 38.931 kgs. of impure potassium hexachororhodate was dissolved in hot water to give a solution containing 10 gms. per litre of rhodium, and was passed, in a series of charges, through 35 lbs. of Zeo-Karb 215 resin in a column 5 ft. long and 6 ins. diameter. The pure solution of rhodium chloride emerging from the column was concentrated and converted to ammonium hexachlororhodate by the addition of pure ammonium chloride. On ignition the ammonium hexachlororhodate yielded rhodium metal. The impurities in the impure potassium hexachlororhodate were 0.015% of lead, 0.005% of bismuth and 0.060% of tellurium, all expressed as a percentage of the rhodium content of the salt. The final yield of pure rhodium was 8.836 kgs., containing 0.0002% of lead, less than 0.0001% of bismuth and 0.002% of tellurium.

5. A solution of impure sodium hexanitritorhodate containing 10 g./l. of rhodium, was passed through a column of Dowex 50 cation exchange resin in the hydrogen form. The effluent from the column was examined spectrographically for impurities. As the starting material was heavily contaminated with copper, nickel and magnesium, it was difficult to obtain exact figures for the initial concentration of impurities.

The degree of purification brought about by the process is shown in the following Table, in which the amounts of base metal are expressed as a percentage of the rhodium content of the solution.

| Impurity | Per cent in soln. before treatment | Per cent in soln. after treatment |
|---|---|---|
| Pb | approx. 0.003 | 0.001. |
| Bi | >0.10 | 0.008. |
| Te | >0.10 | 0.10. |
| Fe | >0.10 | 0.05. |
| Mn | 0.001 | <0.001. |
| Cu | Very strong | Very faint. |
| Ni | do | Do. |
| Mg | Intensely strong | Fairly strong. |

Comparing the separate operations of the process of the present invention and those of the earlier processes of purification, it was found that the process of the present invention purifies the rhodium to a much higher degree in considerably fewer operations. It is true that the process of the present invention involves the use of more dilute solutions than those usually employed in the normal processes of purification and consequently gives greater volumes of solution for evaporation. However, evaporation of the treated solution takes place quickly and without difficulty.

What we claim is:

1. A process for the purification of rhodium which comprises treating an aqueous solution of a water-soluble complex rhodium compound in which the rhodium is present in the anion in which the concentration of the said compound is up to 1/10 molar with a cation exchange resin containing a sulphonic acid group to remove impurities from the solution.

2. A process for the purification of rhodium which comprises treating an aqueous solution of a water-soluble complex rhodium salt in which the rhodium is present in the anion in which the concentration of the said salt is up to 1/10 molar with a cation exchange resin containing a sulphonic acid group to remove impurities from the solution.

3. A process for the purification of rhodium which comprises treating an aqueous solution of a water-soluble complex rhodium acid in which the concentration of the said acid is up to 1/10 molar with a cation exchange resin containing a sulphonic acid group to remove impurities from the solution.

4. A process for the purification of rhodium which comprises treating an aqueous solution of potassium hexachlororhodate in a concentration of up to 1/10 molar with a cation exchange resin containing a sulphonic acid group to remove impurities from the solution.

5. A process for the purification of rhodium which comprises treating an aqueous solution of a water-soluble complex rhodium compound in which the rhodium is present in the anion in which the concentration of the said compound is up to 1/10 molar and having a pH between 1 and 5, with a cation exchange resin containing a sulphonic acid group to remove impurities from the solution.

6. A process for the purification of rhodium which comprises passing an approximately 1/10 molar aqueous solution of potassium hexachlororhodate having a pH between 1 and 5 through a column of a cation exchange resin containing a sulphonic acid group to remove impurities from the solution.

FRANCIS SIDNEY CLEMENTS.
ALAN RICHARDSON RAPER.

REFERENCES CITED

The following references are of record in the file of this patent:

Mellor: "Comprehensive Treatise on Inorganic and Theoretical Chemistry," vol. 15, 1936, pages 549, 550, pub. by Longmans, Green and Co., New York.